US008487748B2

(12) United States Patent
Morillas Bueno et al.

(10) Patent No.: US 8,487,748 B2
(45) Date of Patent: Jul. 16, 2013

(54) SYSTEM FOR THE REMOTE CONTROL OF AT LEAST ONE ELECTRICAL HOUSEHOLD APPLIANCE

(75) Inventors: Begona Morillas Bueno, Txurdinaga-Bilbo (ES); Daniel De Los Toyos Lopez, Eibar (ES)

(73) Assignee: Eika, S. Coop, Etxebarria (Bizkaia) (ES)

( * ) Notice: Subject to any disclaimer, the term of this patent is extended or adjusted under 35 U.S.C. 154(b) by 896 days.

(21) Appl. No.: 12/114,679

(22) Filed: May 2, 2008

(65) Prior Publication Data

US 2008/0272930 A1 Nov. 6, 2008

(30) Foreign Application Priority Data

May 3, 2007 (ES) ............................... 200700903 U

(51) Int. Cl.

*G05B 11/01* (2006.01)
*G08C 19/16* (2006.01)
*H04B 5/00* (2006.01)

(52) U.S. Cl.

USPC .................. 340/13.24; 340/12.22; 340/12.51; 455/41.1

(58) Field of Classification Search

USPC ............... 340/825.49, 825, 3.1, 12.22–12.29, 340/12.51; 455/41.1–41.3

See application file for complete search history.

(56) References Cited

U.S. PATENT DOCUMENTS 5,530,896 A * 6/1996 Gilbert .............................. 710/9
5,726,645 A * 3/1998 Kamon et al. ............. 340/12.28
5,892,758 A * 4/1999 Argyroudis ................... 370/335
6,407,779 B1 * 6/2002 Herz ............................ 348/734
6,531,964 B1 * 3/2003 Loving ....................... 340/12.51
6,538,556 B1 * 3/2003 Kawajiri ........................ 340/3.2
6,657,679 B2 * 12/2003 Hayes et al. .................. 348/734
7,068,143 B2 * 6/2006 Doering et al. ................ 340/3.1
7,679,525 B2 * 3/2010 Nielsen ...................... 340/693.1
7,764,191 B2 * 7/2010 Hall et al. .................. 340/12.51
8,081,102 B1 * 12/2011 Provis ........................... 341/173
2002/0084912 A1 * 7/2002 Stefanik ................... 340/825.69
2003/0139177 A1 * 7/2003 Doering et al. ............... 455/420

FOREIGN PATENT DOCUMENTS

DE 4403399 8/1995
EP 578600 1/1994
GB 2256515 12/1992
WO WO0139151 5/2001

* cited by examiner

*Primary Examiner* — Daniel Wu
*Assistant Examiner* — Mohamed Barakat
(74) *Attorney, Agent, or Firm* — Tim L. Kitchen; Peter B. Scull; Hamilton, DeSanctis & Cha LLP

(57) ABSTRACT

System for the remote control of at least one electrical household appliance with a first transmitter/receiver and an auxiliary receiver incorporated into the electrical household appliance, and a second transmitter/receiver and an auxiliary transmitter incorporated into a remote control device that includes a screen for displaying information received by and/or transmitted from the remote control device. The system of remote control may use a primary system of short-range communication between the auxiliary transmitter and the auxiliary receiver and a secondary system of long-range communication between the first transmitter/receiver and the second transmitter/receiver, enabling a critical-parameter control command to be sent from the remote control device to the electrical household appliance via the secondary system only once the secondary system is activated, the secondary system then being bidirectional.

16 Claims, 4 Drawing Sheets

SYSTEM FOR THE REMOTE CONTROL OF AT LEAST ONE ELECTRICAL HOUSEHOLD APPLIANCE

CROSS-REFERENCE TO RELATED APPLICATION

This application claims priority as a regular U.S. Utility Application from the Spanish Application No. U200700903 filed on May 3, 2007, the subject matter of which hereby being incorporated by reference herein in its entirety as though fully set forth herein.

TECHNICAL FIELD

The present development relates to a system for the remote control of at least one electrical household appliance through a remote control device.

BACKGROUND

There are known unidirectional systems of remote control of an electrical household appliance, through a remote control device, such as a fume extractor provided with a receiver unit that controls the fan when it is activated by a remote device. This extractor is also provided with a sensor receiver that receives a signal from the remote device when the remote device is activated so that the signal switches on the extractor.

Also described is an unidirectional system of remote control of electrical household appliances, in particular of a ceramic hob cooker, which incorporates a transmitter and an infrared sensor receiver, the sensor receiver capable of being beneath the ceramic hob and the operating controls of the ceramic hob cooker capable of being fitted on the front of the extractor hood or in an area inside the radius of action of the infrared signals or radio waves, the control being performed by means of a remote control device.

Also disclosed is an adapted interactive remote controller for controlling a household appliance. The system of remote control is bidirectional and comprises a transmitter and a receiver, disposed both on the remote controller and on the household appliance, so that they enable the remote controller and the household appliance to communicate continually with each other, sending and receiving information and control signals, with the information emitted to the electrical domestic appliance and the information received from the electrical domestic appliance capable of being displayed continually on a screen disposed on the remote controller.

SUMMARY OF THE DISCLOSURE

The present development describes an object of the invention to provide a system for the remote control of at least one electrical household appliance through a remote control device.

In one embodiment, the system for the remote control of at least one electrical household appliance through a remote control device comprises an auxiliary receiver and a first transmitter/receiver incorporated into the electrical household appliance, and an auxiliary transmitter and a second transmitter/receiver incorporated into the remote control device, the remote control device including a screen that enables the user to view information received on the remote control device or transmitted from the remote control device. The remote control of the electrical household appliances may cause situations of risk in the home if the user is allowed to change the operating parameters without any guarantee of visual contact with the appliance. To avoid this problem the system of remote control uses a primary system of short-range communication between the auxiliary transmitter and the auxiliary receiver, and a secondary system of long-range communication between the first transmitter/receiver and the second transmitter/receiver, so that the system of remote control enables a critical-parameter control command to be sent from the remote control device to the electrical household appliance through the secondary system of communication only when the primary system is activated, the secondary system being bidirectional, or optionally bidirectional, in this case.

In this way, a system of remote control that is simple and safe to handle may be obtained, thereby enabling the exchange of information between the electrical household appliance and the remote control device from anywhere at home through the secondary system of communication, and enabling the remote control to handle the critical parameters of the electrical household appliance by means of the remote control device through the secondary system of communication only when the primary system is activated, thereby avoiding improper and dangerous handling that could cause accidents.

These and other advantages and characteristics of the development will be made evident in light of the drawings and the detailed description thereof.

DETAILED DESCRIPTION

FIGS. 1-5 show schematic views of a system for the remote control of an electrical household appliance 1, mainly for a glass ceramic hob cooker, although it could also apply to any other household appliance such as a fume extractor, oven, air conditioning etc, and which comprises an auxiliary receiver 10*a* and a first transmitter/receiver 10*b* disposed on the visible exterior surface of the electrical household appliance 1 or beneath the surface, and an auxiliary transmitter 11*a* and a second transmitter/receiver 11*b* incorporated into a remote control device 2.

Figure 6:
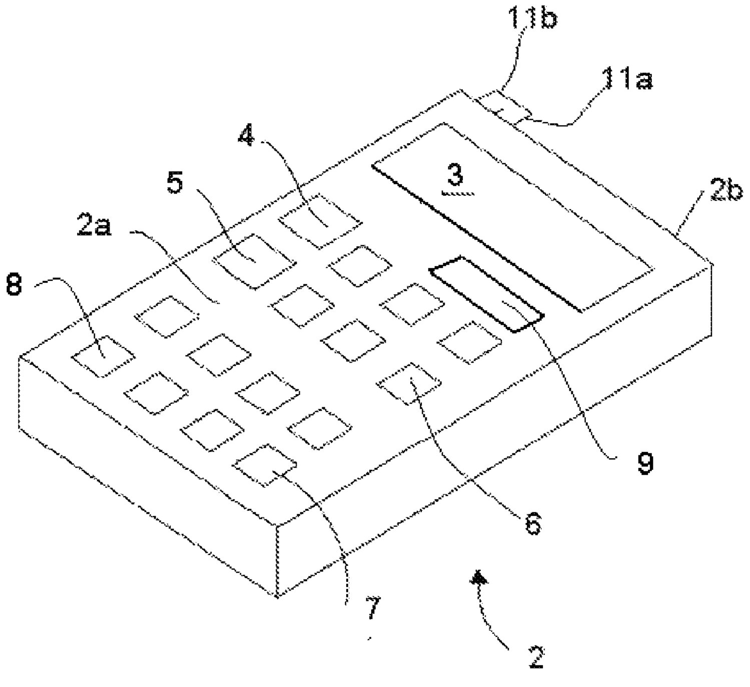
FIG. 6 shows a view in perspective of a remote control device of a system of remote control according to any of FIGS. 1 to 5 and FIG. 7.

In one embodiment, the remote control device 2, shown in FIG. 6, has the form of a geometrical rectangular prism and includes on an upper surface 2*a*, a display screen 3 that enables the user to view information received on the remote control device 2 or information transmitted from the remote control device 2 to the electrical household appliance 1, and a series of push buttons 4-8 disposed on the upper surface 2*a* and adjacent to the display screen 3.

The information transmitted from the remote control device 2 to the electrical household appliance 1 may be a control command or an information command. The control command may be a non-critical-parameter control command 16, e.g. those parameters of the household appliance 1 whose modification does not cause situations of risk at home even when visual contact with the electrical household appliance is not guaranteed, such as control of the light, the switching on of cooker extractors, etc, or a critical-parameter control command 17, for example, those parameters of the household appliance 1 whose modification may cause situations of risk at home if the electrical household appliance is not visualised or outside a designated safety range, such as the switching on or off of the appliance, controlling the temperature, power, etc. The information command 20 is a command that is emitted with the objective of selecting partial information that the user wishes to view on the screen 3.

Alternatively, the information received on the remote control device 2 may be complete information 18, e.g. all the aforementioned control and/or status parameters of the electrical household appliance may be displayed, or partial information 19, when only specific control and/or status parameters that the user has selected through the corresponding information command 20.

In an exemplary embodiment, the push buttons 4-8 comprise an "on" push button 4 for the electrical household appliance, an "off" push button 5 and control push buttons 6 for the control parameters. The remote control device 2 may also include programming push buttons 7 for the purpose of using the remote control device 2 to program the control parameters of the electrical household appliance, selection push buttons 8 through which the user may select the partial information 19 they wish to view on the screen 3, and a known power supply system, not shown, by means of batteries, etc.

The auxiliary transmitter 11*a* and the second transmitter/receiver 11*b* are preferably integrated on a front wall 2*b* of the remote control device 2.

The system of remote control uses a primary system A of short-range communication between the auxiliary transmitter 11*a* of the remote control device 2 and the auxiliary receiver 10*a* of the electrical household appliance, which operates when the remote control device is within a designated safety distance from the appliance which preferably, and generally, corresponds to a radius of vision of a user, and a secondary system B of long-range communication, which exchanges encoded or non-encoded information by means of known communication protocols, between the electrical household appliance 1 and the remote control device 2 through the first transmitter/receiver 10*b* and the second transmitter/receiver 11*b*, in one embodiment the secondary system B being bidirectional when the primary system A is activated.

The primary communication system A uses an infrared-type signal whereas the signals used by the secondary system B of communication are of the radiofrequency type, although other known types for short and long-range communications respectively may be used.

The system of remote control may operate in a situation of range, in which the electrical household appliance 1 is inside the designated safety distance, e.g. a user's general radius of vision, or in an out-of-range situation, in which the electrical household appliance is outside the designated safety distance, e.g. a user's general radius of vision.

When the user operates the remote control device 2, through the push buttons 4-8 or the activation push button 9 specific to the primary system A, the remote control device 2 automatically emits a signal 15 from the auxiliary transmitter 11*a*. Alternatively, the remote control device may continuously emit signal 15.

Figure 1:
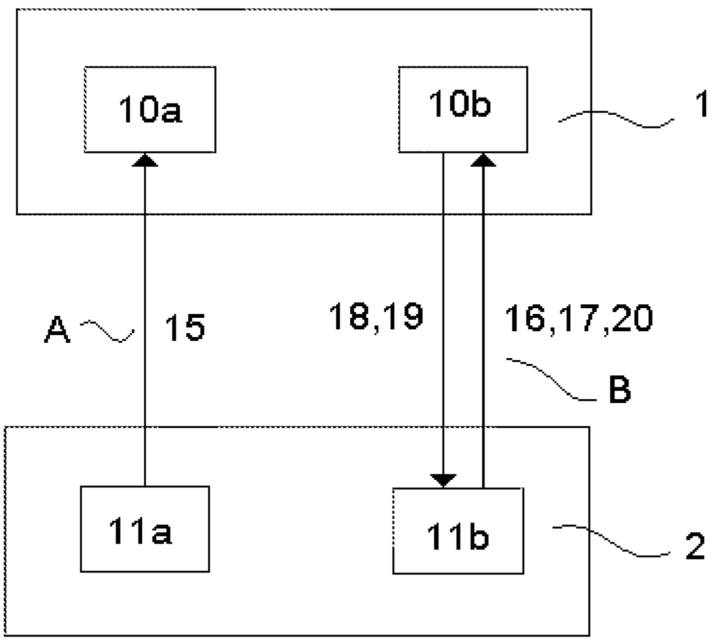
FIG. 1 is a schematic view of an embodiment of a system of remote control, operating in a situation of range.

In accordance with one embodiment, when the system of remote control operates in a situation of range, as shown in FIG. 1, a signal 15 is picked up by the auxiliary receiver 10*a* of the electrical household appliance 1, thereby enabling a control command to be sent from the remote control device 2, so that both the critical-parameter control command 17 and the non-critical-parameter control command 16, and the information command 20 are able to be sent from the second transmitter/receiver 11*b* to the first transmitter/receiver 10*b*, and the complete information 18 or the partial information 19 on the electrical household appliance 1, from the first transmitter/receiver 10*b* to the second transmitter/receiver 11*b*.

If, on the other hand, the household appliance 1 is not inside the user's area of vision, i.e. it operates in the out-of-range situation, as shown in FIGS. 2 to 5, the signal 15 is not picked up by the auxiliary receiver 10*a* and the primary system A of communication remains deactivated, so that it does not allow the critical-parameter control command 17 to be sent from the remote control device 2 to the electrical household appliance 1 through the secondary system B of communication.

In the foregoing embodiment, auxiliary receiver 10*a* may communicate with first transmitter/receiver 10*b* via circuitry located within appliance 1 or by a wireless communication method. In the latter circumstance device 10*a* will also include a wireless transmitting device. Upon receiving a communication/signal from device 10*a*, the first transmitter/receiver 10*b* sends a signal to the second transmitter/receiver 11*b* located in the remote control device 2 that enables a control command to be sent from the remote control device 2 so that both the critical-parameter control command 17 and the non-critical-parameter control command 16 are able to be sent from the second transmitter/receiver 11*b* to the first transmitter/receiver 10*b*. A signal, or set of signals, received from either or both of devices 10*a* and 11*b* (optionally including the information command 20) may be used to enable complete information 18 or partial information 19 on the electrical household appliance 1 to be sent from the first transmitter/receiver 10*b* to the second transmitter/receiver 11*b*.

In an alternative embodiment, device 10*a* may further comprise a wireless transmitter that is capable of sending a signal directly to the second transmitter/receiver 11*b* to enable a control command to be sent from the remote control device 2 so that both the critical-parameter control command 17 and the non-critical-parameter control command 16 are able to be sent from the second transmitter/receiver 11*b* to the first transmitter/receiver 10*b*. A signal, or set of signals, received from either or both of devices 10*a* and 11*b* (optionally including the information command 20) may be used to enable complete information 18 or partial information 19 on the electrical household appliance 1 to be sent from the first transmitter/receiver 10*b* to the second transmitter/receiver 11*b*.

In another embodiment, device 10*a* comprises both a receiver and a transmitter. When signal 15 is picked up by the receiver of device 10*a* the transmitter sends a signal (wireless or via circuitry within appliance 1) to the first transmitter/receiver 10*b* to enable it to execute and/or receive critical-parameter control commands 17 and non-critical-parameter control commands 16 and, optionally, information commands 20.

Figure 7:
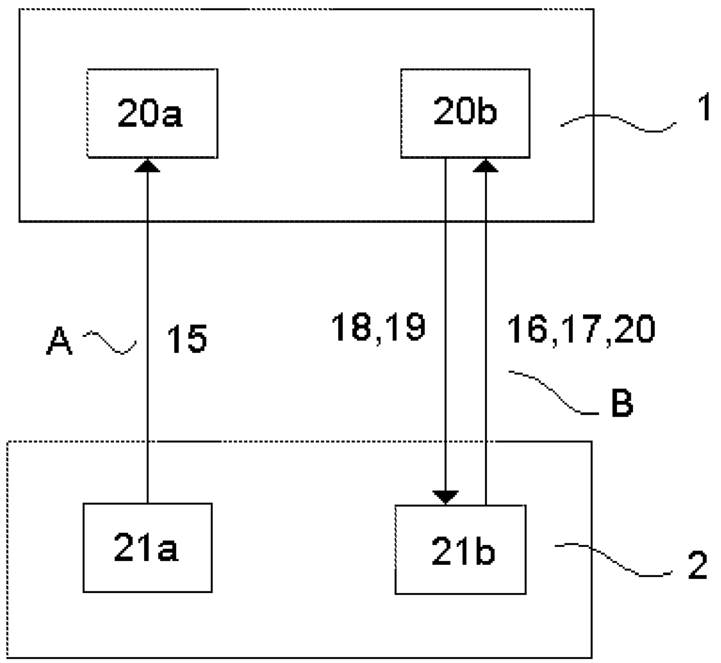
FIG. 7 is a schematic view of another embodiment of a system of remote control, operating in a situation of range.

FIG. 7 shows another embodiment of a system for the remote control of an electrical household appliance. In the embodiments of FIGS. 1-5 signal 15 is emitted from the remote control device 2 and received by appliance 1. In the embodiment of FIG. 7 signal 15 is emitted from the appliance 1 and received by the remote control device 2. The system of FIG. 7 includes an appliance 1 having an auxiliary transmitter 20*a* and a first transmitter/receiver 20*b*, and a remote control device 2 having an auxiliary receiver 21*a* and a second transmitter/receiver 21*b* with devices 20*a* and 21*a* comprising the primary communication system A, and devices 20*b* and 21*b* comprising secondary communication system B. In one embodiment, transmitter 20*a* continuously emits signal 15 when the appliance 1 is connected to a power source. In other embodiments a switch or other selection device on the appliance permits a user to activate and deactivate emission of signal 15.

In accordance with one embodiment, when the system of remote control operates in a situation of range, as shown in FIG. 7, the signal 15 is picked up by the auxiliary receiver 21*a* of the remote control device 2, thereby enabling a control command to be sent from the remote control device 2, so that both the critical-parameter control command 17 and the non-critical-parameter control command 16, and the information command 20 are able to be sent from the second transmitter/receiver 21*b* to the first transmitter/receiver 20*b*, and the complete information 18 or the partial information 19 on the electrical household appliance 1, from the first transmitter/receiver 20*b* to the second transmitter/receiver 21*b*.

If, on the other hand, the household appliance 1 is not inside the designated safety distance of the remote control device 2, such as, for example, the user's general area of vision, i.e. it operates in the out-of-range situation, the signal 15 is not picked up by the auxiliary receiver 21*a* and the primary system A of communication remains deactivated, so that it does not allow the critical-parameter control command 17 to be sent from the remote control device 2 to the electrical household appliance 1 through the secondary system B of communication.

In the foregoing embodiment, auxiliary receiver 21*a* may communicate with second transmitter/receiver 21*b* via circuitry located within the remote control device 2 or by a wireless communication method. In the latter circumstance device 21*a* will also include a wireless transmitting device. Upon receiving signal 15 from auxiliary transmitter 20*a*, device 21*a* sends a signal to the second transmitter/receiver 21*b* that enables a control command to be sent from the remote control device 2 so that both the critical-parameter control command 17 and the non-critical-parameter control command 16 are able to be sent from the second transmitter/receiver 21*b* to the first transmitter/receiver 20*b*. A signal, or set of signals, received from either or both of devices 21*a* and 21*b* (optionally including the information command 20) may be used to enable complete information 18 or partial information 19 on the electrical household appliance 1 to be sent from the first transmitter/receiver 20*b* to the second transmitter/receiver 21*b*.

In an alternative embodiment, device 21*a* comprises both a receiver and a wireless transmitter. When signal 15 is picked up by the receiver of device 21*a* the transmitter sends a wireless signal to the first transmitter/receiver 20*b* to enable it to execute and/or receive critical-parameter control commands 17 and non-critical-parameter control commands 16 and, optionally, information commands 20.

Figure 2:
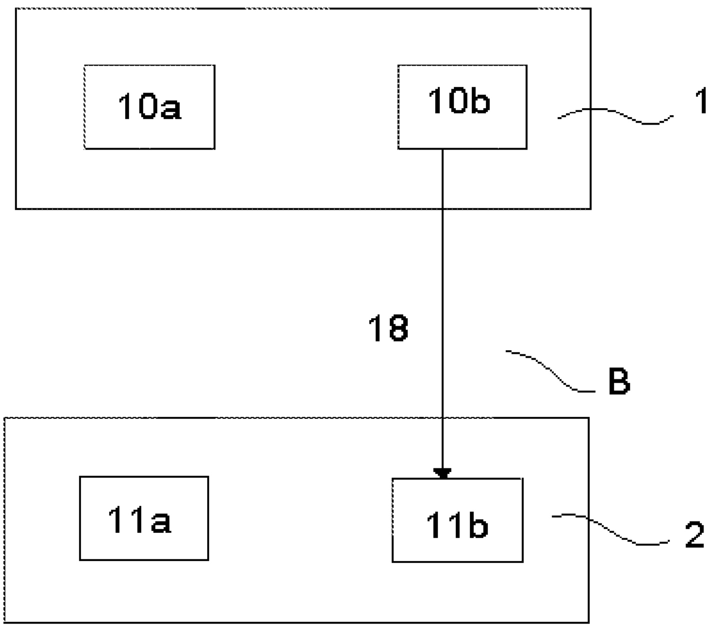
FIG. 2 is a schematic view of an embodiment of a system of remote control, operating in an out-of-range situation.

FIG. 2 shows an embodiment of a system of remote control operating in the out-of-range situation, so that the primary system A of communication is not activated and the secondary system B of communication is unidirectional, e.g. in this case only the complete information 18 travels from the domestic appliance 1 to the remote control device 2 through the secondary system B.

Figure 3:
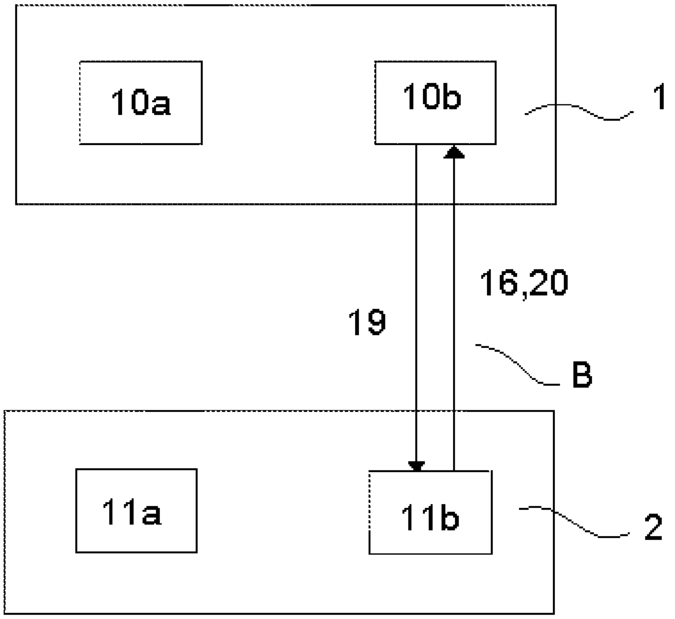
FIG. 3 is a schematic view of another embodiment of a system of remote control, operating in an out-of-range situation.

FIG. 3 shows another embodiment of a system of remote control operating in an out-of-range situation, in which the primary system A of communication is not activated, although the control system does enable the non-critical-parameter control command 16 and/or the information command 20 to be sent from the remote control device 2 to the electrical household appliance 1, and the partial information 19 requested through the information command 20 is sent from the household appliance 1 to the remote control device 2 through the secondary system B of communication.

Figure 4:
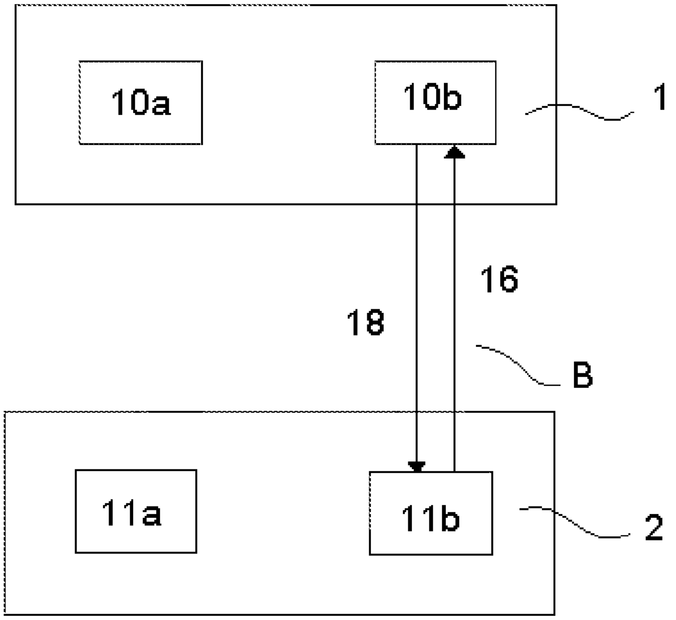
FIG. 4 is a schematic view of yet another embodiment of a system of remote control, operating in an out-of-range situation.

FIG. 4 shows another embodiment of a system of remote control operating in an out-of-range situation, in which it enables the user to send the non-critical-parameter control command 16 from the remote control device 2 to the electrical household appliance 1, and the display on the screen 3 of the complete information 18 sent from the household appliance 1 to the remote control device 2 through the secondary system B of communication.

Figure 5:
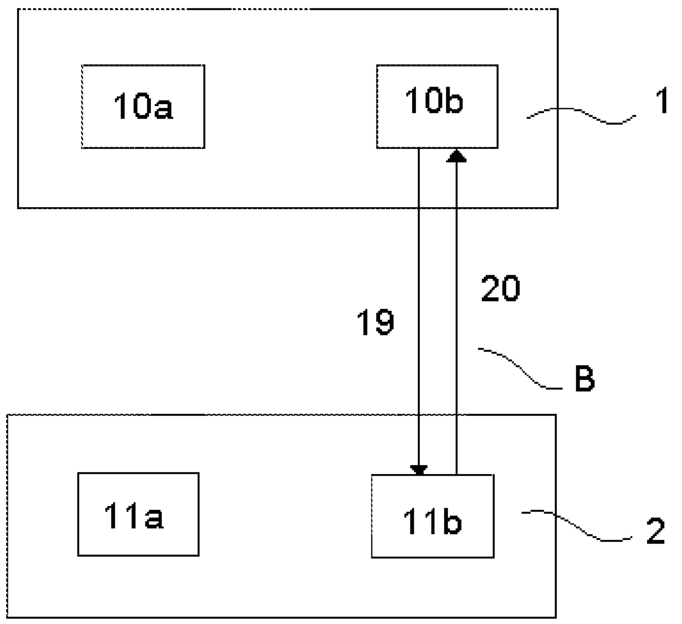
FIG. 5 is a schematic view of an embodiment of a system of remote control, operating in an out-of-range situation.

FIG. 5 shows a yet embodiment of a system of remote control operating in an out-of-range situation, in which the system of remote control enables the user to send the information command 20 from the remote control device 2 to the electrical household appliance 1 to determine the partial information 19 the user wishes to view on the screen 3, through the secondary system B of communication.

Thus the primary system A of communication acts as a safety key enabling or disabling the remote control of the critical parameters of the electrical household appliance 1, so that the user may change and control the critical control parameters 17 only when the primary system A is active, e.g. when the electrical household appliance 1 is situated inside the designated safety distance, e.g. the user's general radius of vision, whereas if the primary system A is inactive, the user may not send critical-parameter control commands 17 from the remote control device 2 for safety reasons, given that the electrical household appliance is not inside the user's general range of vision or within the designated safety distance.

In alternative embodiments, the system of remote control may control by means of a remote control device one or more electrical household appliances, which may be independent to each other, the remote control device acting independently on each of them, or the electrical household appliances may communicate with each other bidirectionally, in which case the remote control through the remote control unit would be performed directly on one of the electrical household appliances thereby enabling the control of various appliances from the control device in a simple and ordered way.

What is claimed is:

1. A system comprising: a household appliance and a remote control device, the household appliance having at least one critical parameter and at least one non-critical parameter which are controlled by the remote control device; wherein in each of the least one critical parameter is a parameter whose modification is likely to cause a situation of risk at home if the electrical household appliance is not visualized or if the electrical household appliance is outside a designated safety range, and wherein in each of the non-critical parameter is a parameter whose modification does not cause a situation of risk at home even when visual contact with the electrical household appliance is not guaranteed; the household appliance and remote control device configured to communicate via a short-range communication system and a long-range communication system, the at least one critical parameter controllable by the remote control device via the long-range communication system only when the short-range communication system is activated, the at least one non-critical parameter controllable by the remote control device via the long-range communication system when the short-range communication system is activated and also when the short-range communication system is not activated, the short-range communication system comprising a short-range transmitter on the remote control device and a short-range receiver on the appliance, the short-range communication system being activated when a short-range signal from the short-range transmitter is being picked up by the short-range receiver.

2. A system according to claim 1 wherein the short-range transmitter emits an infra-red signal capable of being picked up by the short-range receiver.

3. A system according to claim 1 wherein the short-range receiver is capable of picking up the short-range signal from the short-range transmitter when the remote control device is located within a designated safety distance of the appliance.

4. A system according to claim 1 wherein the designated safety distance corresponds to a user's radius of vision.

5. A system according to claim 1 wherein the long-range communication system comprises a first long-range transmitter on the remote control device and a first long-range receiver on the household appliance, the first long-range transmitter configured to transmit a command signal to be received by the first long-range receiver to control the at least one critical parameter when the short-range communication system is activated.

6. A system according to claim 5 wherein the long-range communication system further comprises a second long-range transmitter on the household appliance and a second long-range receiver on the remote control device, the second long-range transmitter capable of transmitting full or partial information of the household appliance to the second long-range receiver on the remote control device.

7. A system according to claim 6 wherein the full or partial information is displayed on the remote control device.

8. A system according to claim 1 wherein the short-range signal is generated automatically when the remote control device is activated.

9. A system according to claim 1 wherein the short-range signal is generated automatically when an activation button is activated on the remote control device.

10. A system according to claim 1 wherein the short-range communication system uses an infra-red type signal and the long-range communication system uses a radiofrequency type signal.

11. A system comprising: a household appliance and a remote control device, the household appliance having at least one critical parameter and at least one non-critical parameter which are controlled by the remote control device; wherein in each of the least one critical parameter is a parameter whose modification is likely to cause a situation of risk at home if the electrical household appliance is not visualized or if the electrical household appliance is outside a designated safety range, and wherein in each of the non-critical parameter is a parameter whose modification does not cause a situation of risk at home even when visual contact with the electrical household appliance is not guaranteed; the household appliance and remote control device configured to communicate via a short-range communication system and a long-range communication system, the at least one critical parameter and the at least one non-critical parameter controllable by the remote control device via the long-range communication system, the short-range communication system including a short-range transmitter on the remote control device and a short-range receiver on the appliance, the short-range communication system being activated when a short-range signal from the short-range transmitter is being picked up by the short-range receiver, the long-range communication system including a first long-range transmitter on the remote control device and a first long-range receiver on the appliance, the first long range transmitter configured to transmit a first control command signal to be received by the first long range receiver to control the at least one critical parameter only when the short-range communication system is activated, the first long range transmitter configured to transmit a second control command signal to control the at least one non-critical parameter when the short-range communication system is activated and also when the short-range communication system is not activated.

12. A system according to claim 11 wherein the short-range signal is an infra-red type signal and the first and second control command signals are radiofrequency type signals.

13. A system according to claim 11 wherein the long-range communication system further comprises a second long-range transmitter on the household appliance and a second long-range receiver on the remote control device, the second long-range transmitter capable of transmitting full or partial information of the household appliance to the second long-range receiver on the remote control device.

14. A system according to claim 11 wherein the short-range receiver is capable of picking up the short-range signal from the short range transmitter when the remote control device is located within a designated safety distance of the appliance.

15. A system according to claim 14 wherein the designated safety distance generally corresponds to a user's radius of vision.

16. A system comprising: a household appliance and a remote control device, the household appliance having at least one critical parameter and at least one non-critical parameter which are controlled by the remote control device; wherein in each of the least one critical parameter is a parameter whose modification is likely to cause a situation of risk at home if the electrical household appliance is not visualized or if the electrical household appliance is outside a designated safety range, and wherein in each of the non-critical parameter is a parameter whose modification does not cause a situation of risk at home even when visual contact with the electrical household appliance is not guaranteed; the household appliance and remote control device configured to communicate via a short-range communication system and a long-range communication system, the at least one critical parameter controllable by the remote control device via the long-range communication system only when the short-range communication system is activated, the at least one non-critical parameter controllable by the remote device via the long-range communication system when the short-range communication system is activated and also when the short-range communication system is not activated, the short-range communication system comprising a short-range transmitter on the household appliance and a short-range receiver on the remote control device, the short-range communication system being activated when a short-range signal from the short-range transmitter is being picked up by the short-range receiver.

* * * * *